United States Patent
Tamada et al.

(10) Patent No.: US 11,211,876 B2
(45) Date of Patent: Dec. 28, 2021

(54) VOLTAGE COMPENSATION DEVICE

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Shunsuke Tamada, Suginami Tokyo (JP); Yuji Watanabe, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

(*) Notice: Subject to any disclaimer, the term of this patent is extended or adjusted under 35 U.S.C. 154(b) by 0 days.

(21) Appl. No.: 16/768,303

(22) PCT Filed: Sep. 3, 2018

(86) PCT No.: PCT/JP2018/032547
§ 371 (c)(1),
(2) Date: May 29, 2020

(87) PCT Pub. No.: WO2019/106903
PCT Pub. Date: Jun. 6, 2019

(65) Prior Publication Data
US 2021/0194380 A1    Jun. 24, 2021

(30) Foreign Application Priority Data

Nov. 30, 2017 (JP) .............................. JP2017-230221

(51) Int. Cl.
*H02M 5/458* (2006.01)
*H02J 3/26* (2006.01)
(Continued)

(52) U.S. Cl.
CPC ............. *H02M 5/4585* (2013.01); *H02J 3/26* (2013.01); *H02M 7/5387* (2013.01); *H02M 7/219* (2013.01); *H02M 7/2173* (2013.01)

(58) Field of Classification Search
CPC .. H02M 5/4585; H02M 7/219; H02M 7/2173; H02J 3/26; H02J 3/16
See application file for complete search history.

(56) References Cited

U.S. PATENT DOCUMENTS 5,321,598 A * 6/1994 Moran ...................... H02J 3/01
                                                      323/207
5,586,018 A * 12/1996 Aoyama ................... H02J 3/01
                                                      323/207
(Continued)

FOREIGN PATENT DOCUMENTS

JP    H8-111937 A    4/1996
JP    H11-41812 A    2/1999
(Continued)

OTHER PUBLICATIONS

Sasaki et al., "High Speed TVR for Power Distribution Lines and its Test Results," IEEJ Transactions on Power and Energy (2003), 123:1105-11.

*Primary Examiner* — Jue Zhang
(74) *Attorney, Agent, or Firm* — Finnegan, Henderson, Farabow, Garrett & Dunner L.L.P.

(57) ABSTRACT

A voltage compensation device according to an embodiment includes a controller including first and second coordinate transformation circuits, and first and second arithmetic parts. The first coordinate transformation circuit generates first and second outputs that are mutually-orthogonal by performing a rotating coordinate transformation of the normal-phase components of a three phase AC. The first arithmetic part calculates a system voltage based on a DC component of the first output and generates a first compensation amount (Continued)

corresponding to a compensation voltage set to compensate a shift of the system voltage from a preset target voltage. The second coordinate transformation circuit generates third and fourth outputs that are mutually-orthogonal by performing a rotating coordinate transformation of reverse-phase components of the three-phase AC. The second arithmetic part generates second compensation amount of a reverse-phase component of the system voltage based on DC components of the third and fourth outputs.

7 Claims, 8 Drawing Sheets

(51) Int. Cl.
*H02M 7/5387* (2007.01)
*H02M 7/217* (2006.01)
*H02M 7/219* (2006.01)

(56) References Cited

U.S. PATENT DOCUMENTS

| | | | |
|---|---|---|---|
| 5,751,138 A * | 5/1998 | Venkata | H02M 5/4585 323/207 |
| 6,348,778 B1 | 2/2002 | Weinhold et al. | |
| 8,004,119 B2 * | 8/2011 | Tsang | H02J 3/01 307/105 |
| 9,122,296 B2 * | 9/2015 | Lam | G05F 1/70 |
| 2011/0134672 A1 * | 6/2011 | Sato | H02M 5/4585 363/126 |
| 2019/0128555 A1 * | 5/2019 | Takeda | H02M 1/12 |

FOREIGN PATENT DOCUMENTS

| | | |
|---|---|---|
| JP | 2001-515338 | 9/2001 |
| JP | 2017-103973 A | 6/2017 |
| JP | 2017-216841 A | 12/2017 |
| WO | WO 2017/209183 A1 | 12/2017 |

* cited by examiner

VOLTAGE COMPENSATION DEVICE

TECHNICAL FIELD

An embodiment of the invention relates to a voltage compensation device.

BACKGROUND ART

In a power system, there are cases where the receiving voltage at the end of the power system decreases due to a voltage drop due to the increase of the power line impedance according to the distance from the power substation. It is necessary to be able to utilize a constant voltage in the power system regardless of the distance from the power substation.

PRIOR ART DOCUMENT

Non Patent Document

[Non Patent Document 1] Y. Sasaki, T. Yoshida, N. Seki, T. Watanabe and Y. Saito, "High Speed TVR for Power Distribution Lines and its Test Results", IEEJ Transactions on Power and Energy, vol. 123.

SUMMARY OF INVENTION

Problem to be Solved by the Invention

An embodiment provides a voltage compensation device that quickly and continuously compensates the voltage of a power system to have an appropriate value.

Means for Solving the Problem

A voltage compensation device according to an embodiment includes a power converter including an inverter circuit including a switching element that is of a self arc-extinguishing type, series transformers including primary windings connected in series to phases of a three-phase alternating current and secondary windings connected to an output of the power converter, and a controller generating a drive signal driving the switching element based on voltages of the phases of the three-phase alternating current and supplying the drive signal to the power converter. The controller includes a first coordinate transformation circuit generating a first output that is a vector component of a same phase as normal-phase components of the three-phase alternating current by performing a rotating coordinate transformation of the normal-phase components and a second output that is a vector component orthogonal to the first output, a first arithmetic part calculating a system voltage indicating a voltage value of the three-phase alternating current based on a direct current component of the first output and generating a first compensation amount corresponding to a compensation voltage set to compensate a shift of the system voltage from a preset target voltage, a second coordinate transformation circuit generating a third output and a fourth output that are mutually-orthogonal by performing a rotating coordinate transformation of reverse-phase components of the three-phase alternating current, and a second arithmetic part generating a second compensation amount that is a compensation amount of a reverse-phase component of the system voltage based on a direct current component of the third output and a direct current component of the fourth output. The controller generates the drive signal based on the first compensation amount and the second compensation amount. The first arithmetic part generates the first compensation amount to cause the compensation voltage when the system voltage is within a prescribed range to be less than the compensation voltage when the system voltage is outside the prescribed range.

BRIEF DESCRIPTION OF DRAWINGS

Embodiments of the invention will now be described with reference to the drawings.

MODES FOR CARRYING OUT THE INVENTION

Figure 1:
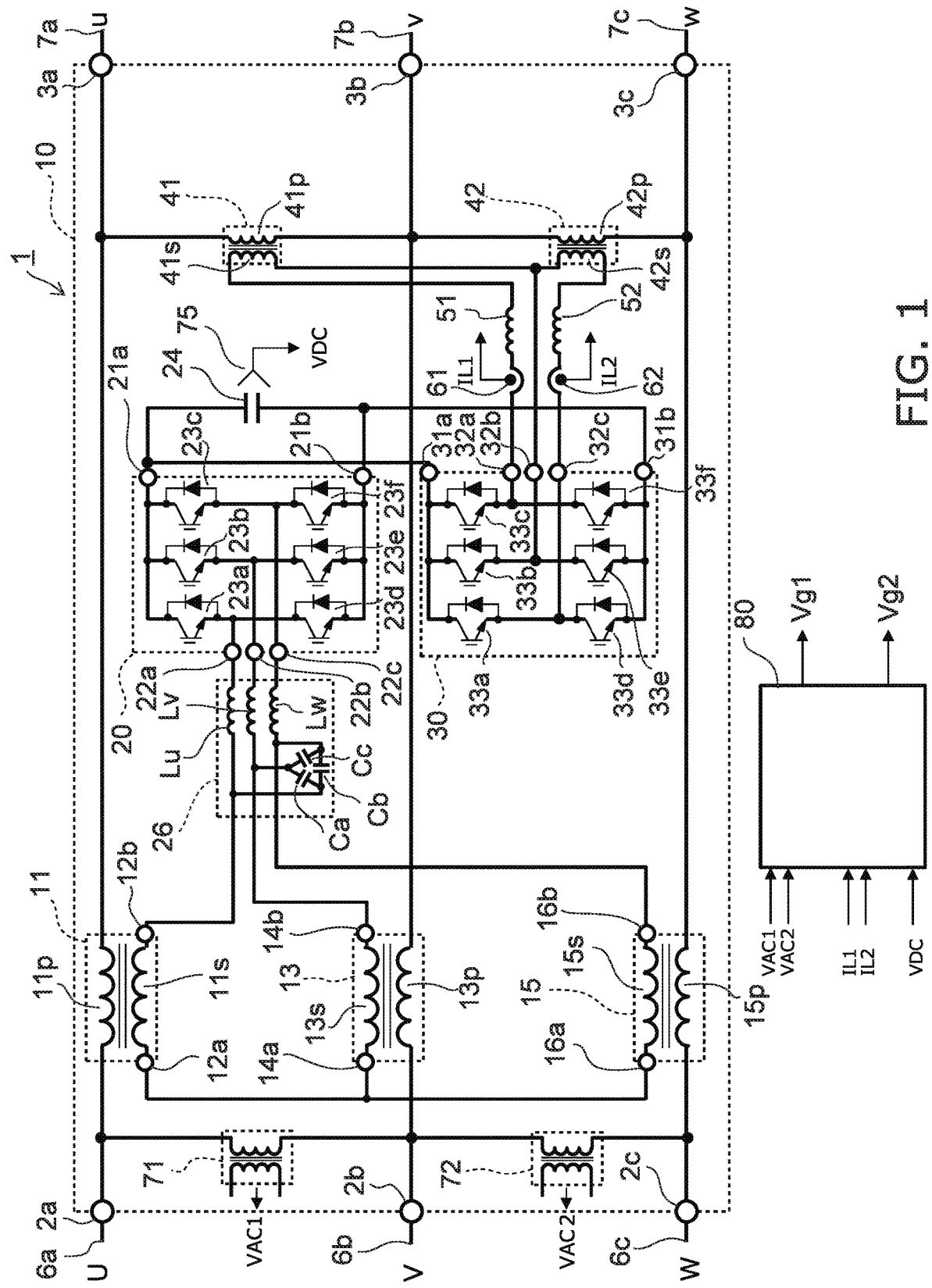
FIG. 1 is a block diagram illustrating a voltage compensation device according to a first embodiment.

Embodiments of the present invention will be described below with reference to the drawings.

It is noted that the drawings are schematic or conceptual, and the relationship between the thickness and the width of each portion, the ratio of the sizes between the portions, and the like are not necessarily the same as the actual ones. Also, even in the case of representing the same part, the dimensions and ratios of the parts may be represented differently.

The identical portions in the drawings are given the same reference signs, and the detailed explanations thereof will be omitted. Different portions will be mainly described.

First Embodiment

FIG. 1 is a block diagram illustrating a voltage compensation device according to the embodiment.

Figure 2:
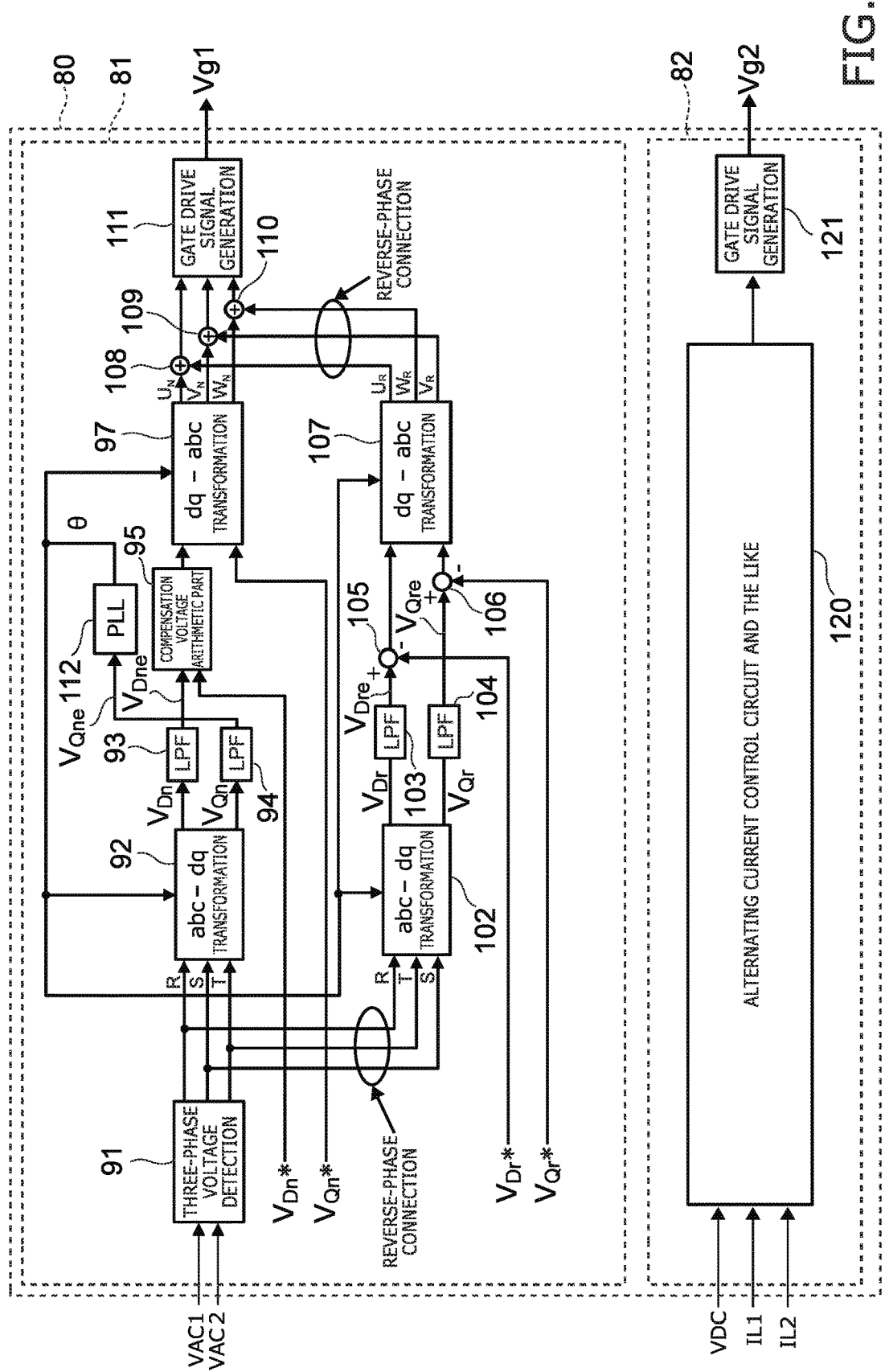
FIG. 2 is a block diagram illustrating a controller which is a portion of the voltage compensation device of the first embodiment.

FIG. 2 is a block diagram illustrating a controller which is a portion of the voltage compensation device of the embodiment.

The configuration of the voltage compensation device 1 of the embodiment will now be described.

As shown in FIG. 1, the voltage compensation device 1 of the embodiment includes a voltage compensator 10 and a controller 80. The voltage compensator 10 includes series transformers 11, 13, and 15, a first power converter 20, a second power converter 30, parallel transformers 41 and 42, inductors 51 and 52, current detectors 61 and 62, alternating current voltage detectors 71 and 72, and a direct current voltage detector 75. The voltage compensation device 1 is connected in series to the power system by the voltage compensator 10. The power system is a power distribution system of three-phase alternating current made of a U-phase, a V-phase, and a W-phase. Hereinbelow, when viewed from the voltage compensation device 1 connected in series to the power system, the power substation side is called upstream, and the consumer side is called downstream. The voltage compensation device 1 is connected to the U-phase upstream 6a at an input terminal 2a and is connected to the U-phase downstream 7a at an output terminal 3a (a u-phase). The voltage compensation device 1 is connected to the V-phase upstream 6b at an input terminal 2b and is connected to the V-phase downstream 7b at an output terminal 3b (a v-phase). The voltage compensation device 1 is connected to the W-phase upstream 6c at an input terminal 2c and is connected to the W-phase downstream 7c at an output terminal 3c (a w-phase). The voltage compensation device 1 detects an increase or a decrease of the voltages upstream 6a to 6c and downstream 7a to 7c of the power system and compensates the voltage of the power system to be within the range of a target value.

The series transformers 11, 13, and 15 respectively include primary windings 11p, 13p, and 15p and secondary windings 11s, 13s, and 15s. The primary winding 11p of the series transformer 11 is connected between the input terminal 2a and the output terminal 3a and is connected in series to the U-phase of the power system. The primary winding 13p of the series transformer 13 is connected between the input terminal 2b and the output terminal 3b and is connected in series to the V-phase of the power system. The primary winding 15p of the series transformer 15 is connected between the input terminal 2c and the output terminal 3c and is connected in series to the W-phase of the power system. That is, the primary windings 11p, 13p, and 15p of the three series transformers 11, 13, and 15 are connected in series to the phases of the power system.

The secondary windings 11s, 13s, and 15s of the series transformers 11, 13, and 15 are connected to each other at one-terminals 12a, 14a, and 16a, and other-terminals 12b, 14b, and 16b of the secondary windings 11s, 13s, and 15s are connected to alternating current output terminals 22a, 22b, and 22c of the first power converter 20. That is, the secondary windings 11s, 13s, and 15s of the series transformers 11, 13, and 15 have a star connection and are connected to the output of the first power converter 20.

The first power converter 20 is connected between a high-voltage direct current input terminal 21a and a low-voltage direct current input terminal 21b. A direct current voltage is supplied to the high-voltage direct current input terminal 21a and the low-voltage direct current input terminal 21b via a capacitor for a direct current link 24. The first power converter 20 includes the alternating current output terminals 22a, 22b, and 22c outputting three-phase alternating current voltages. The alternating current output terminals 22a, 22b, and 22c are connected to the secondary windings 11s, 13s, and 15s of the series transformers 11, 13, and 15 via a filter 26. The first power converter 20 is an inverter device converting the direct current voltage applied between the high-voltage direct current input terminal 21a and the low-voltage direct current input terminal 21b into three-phase alternating current voltages. For example, the first power converter 20 includes six switching elements 23a to 23f. The switching elements 23a to 23f are self arc-extinguishing type switching elements and are, for example, MOSFETs (Metal-Oxide-Semiconductor Field-Effect Transistors), IGBTs (Insulated Gate Bipolar Transistors), etc. The switching elements are connected in series as high-side switches and low-side switches. Three arms of series connections are connected in parallel to configure an inverter circuit. The inverter circuit of the first power converter 20 is not limited to this circuit configuration as long as the direct current voltage can be converted into alternating current voltages having a frequency higher than the frequency of the power system. The inverter circuit may be, for example, a multi-level inverter circuit, a modification of a multi-level inverter circuit, etc.

The filter 26 is connected between the first power converter 20 and the secondary windings 11s, 13s, and 15s of the series transformers 11, 13, and 15. In the example, the filter 26 includes inductors Lu, Lv, and Lw that are connected in series to the phases and capacitors Ca, Cb, and Cc that are connected between the lines. The filter 26 is a low-pass filter that converts, into the frequency of the power system, the high-frequency switching waveform of about several kHz to several 100 kHz output by the first power converter 20. The filter 26 can include a circuit appropriate according to the frequency, the modulation technique, etc., of the output of the first power converter 20.

The direct current link 24 includes a capacitor supplying direct current power to the first power converter 20. The direct current link 24 supplies, to the first power converter 20, active power supplied from the second power converter 30. The direct current link 24 can exchange reactive current with the power system side via the second power converter 30.

The second power converter 30 includes a high-voltage direct current terminal 31a and a low-voltage direct current terminal 31b. The high-voltage direct current terminal 31a and the low-voltage direct current terminal 31b are connected to the direct current link 24. The second power converter 30 includes alternating current terminals 32a, 32b, and 32c. One end of the inductor 51 is connected to one of the alternating current terminals 32a, 32b, or 32c, and in the example, to the alternating current terminal 32a. One end of the inductor 52 is connected to another one of the alternating current terminal 32b or 32c, and in the example, to the alternating current terminal 32c. That is, the second power converter 30 supplies active power to the direct current link 24 by operating as a converter device, and more specifically an active smoothing filter, that converts the alternating current power input to the alternating current terminals 32a, 32b, and 32c into direct current and supplies the direct current to the direct current link 24. The second power converter 30 may be an inverter circuit having the same circuit configuration as the first power converter 20. Similarly to the first power converter 20, the second power converter 30 includes six self arc-extinguishing type switching elements 33a to 33f. The switching elements 33a to 33f are connected in series as high-side switches and low-side switches. Three arms of series connections are connected in parallel to configure an inverter circuit. As long as the inverter circuit of the second power converter 30 can mutually convert between a direct current voltage and an alternating current voltage of a frequency higher than the frequency of the electric power system, the configuration is not limited to this configuration. Although the configuration of the inverter circuit of the second power converter 30 is the same as the configuration of the inverter circuit of the first power converter 20 in the example, a different configuration may be used.

A primary winding 41p of the parallel transformer 41 is connected between the lines on the downstream 7a and 7b side of the U-phase and the V-phase. A primary winding 42p of the parallel transformer 42 is connected between the lines on the downstream 7b and 7c side of the V-phase and the W-phase. One of a secondary winding 41s of the parallel transformer 41 is connected to the other end of the inductor 51, and the other of the secondary winding 41s is connected to the alternating current terminal 32b of the second power converter 30. A secondary winding 42s of the parallel transformer 42 is connected to the other end of the inductor 52, and the other of the secondary winding 42s is connected to the alternating current terminal 32b of the second power converter 30. That is, the secondary windings 41s and 42s of the parallel transformers 41 and 42 have a V-connection to the alternating current terminals 32a to 32c of the second power converter 30 via the inductors 51 and 52.

The current detector 61 is connected in series between the alternating current terminal 32a of the second power converter 30 and the secondary winding 41s of the parallel transformer 41. The current detector 62 is connected in series between the alternating current terminal 32c of the second power converter 30 and the secondary winding 42s of the parallel transformer 42. That is, the current detectors 61 and 62 detect the alternating currents flowing in the inductors 51 and 52 and output current data IL1 and IL2.

The alternating current voltage detectors 71 and 72 are connected to the upstream 6a to 6c side of the power system. The alternating current voltage detector 71 is connected between the lines of the U-phase and the V-phase and detects the line voltage between UV. The alternating current voltage detector 72 is connected between the lines of the V-phase and the W-phase and detects the line voltage between VW. For example, the alternating current voltage detectors 71 and 72 include instrument transformers and transducers converting the outputs of the instrument transformers into appropriate voltage levels. The alternating current voltage detectors 71 and 72 detect the voltages across the primary windings 11p, 13p, and 15p of the series transformers 11, 13, and 15, perform step-down using the instrument transformers, use the transducers to convert the voltages into alternating current voltage data VAC1 and VAC2 which are signals inputtable to the controller 80, and output the alternating current voltage data VAC1 and VAC2.

The direct current voltage detector 75 detects the direct current voltage across the direct current link 24 and outputs direct current voltage data VDC.

In the voltage compensation device 1 of the embodiment, the second power converter 30 may have another configuration as long as the direct current voltage and the active power can be supplied to the first power converter 20.

As shown in FIG. 2, the controller 80 includes a first control circuit 81 and a second control circuit 82. The first control circuit 81 supplies, to the first power converter 20, a gate drive signal Vg1 for controlling the operation of the first power converter 20. The second control circuit 82 supplies, to the second power converter 30, a gate drive signal Vg2 for controlling the operation of the second power converter 30.

The first control circuit 81 includes a three-phase voltage detection circuit 91, abc-dq transformation circuits 92 and 102, low-pass filters 93, 94, 103, and 104, a compensation voltage arithmetic part 95, dq-abc transformation circuits 97 and 107, a gate drive signal generation circuit 111, and a PLL 112.

The first control circuit 81 receives the input of the alternating current voltage data VAC1 and VAC2, generates a compensation amount corresponding to a compensation voltage for each phase voltage, and generates the gate drive signal Vg1 based on the generated compensation amounts. The first control circuit 81 divides the voltages of the phases of the power system into the normal-phase components and the reverse-phase components and performs rotating coordinate transformations. The first control circuit 81 generates a compensation amount according to a preset compensation voltage characteristic for the normal-phase components of the phase voltages. The first control circuit 81 generates a compensation amount by calculating the differences from a target value for the reverse-phase components.

In the voltage compensation device 1 of the embodiment, the first control circuit 81 divides the phase voltages of the power system into the normal-phase components and the reverse-phase components and performs independent processing for the normal-phase components and the reverse-phase components. Hereinbelow, the normal-phase components also are called the normal-phase voltages, and the reverse-phase components also are called the reverse-phase voltages. There are cases where the element or element group that performs the processing of the normal-phase voltages is called the signal processing system of the normal-phase voltage side, and the element or element group that performs the processing of the reverse-phase voltages is called the signal processing system of the reverse-phase voltage side.

The compensation voltage arithmetic part (the first arithmetic part) 95 is provided in the signal processing system of the normal-phase voltage side. A compensation voltage that corresponds to the normal-phase components of the system voltage is set in the compensation voltage arithmetic part 95.

The compensation voltage arithmetic part 95 sets the compensation voltage corresponding to the normal-phase components of the system voltage and outputs a compensation amount corresponding to the compensation voltage that is set.

In the compensation voltage arithmetic part 95 as elaborated below, the magnitude of the compensation voltage with respect to the magnitude of the normal-phase voltage is set to different relationships according to the range of the magnitude of the normal-phase voltage.

For example, when the difference between the magnitude of the normal-phase voltage and the magnitude of the target voltage is within a prescribed range, the magnitude of the output compensation voltage is set to 0 or an extremely small value. When the difference between the magnitude of the normal-phase voltage and the magnitude of the target voltage is greater than the prescribed range, the compensation voltage is set to compensate the normal-phase voltage, and the absolute value of the magnitude of the compensation voltage is set to increase as the magnitude of the normal-phase voltage increases. When the difference between the magnitude of the normal-phase voltage and the magnitude of the target voltage is less than the prescribed range, the compensation voltage is set to compensate the normal-phase voltage, and the absolute value of the magnitude of the compensation voltage is set to increase as the magnitude of the normal-phase voltage decreases. The prescribed range described above is set to a range that is narrower than the range for the target voltage of the magnitude of the compensation voltage to be output by the voltage compensation device 1.

On the other hand, in the signal processing system of the reverse-phase voltage side, a compensation amount that is generated according to the difference between the magnitude of the target voltage and the magnitude of the reverse-phase component of the system voltage is determined.

In the embodiment, when the difference between the magnitude of the normal-phase voltage and the magnitude of the target voltage is within the prescribed range, the first control circuit 81 generates the gate drive signal Vg1 to give priority to the compensation voltage corresponding to the reverse-phase voltage over the compensation voltage corresponding to the normal-phase voltage. When the difference between the magnitude of the normal-phase voltage and the magnitude of the target voltage is greater or less than the prescribed range, the gate drive signal Vg1 is generated to give priority to the compensation voltage corresponding to the normal-phase voltage over the compensation voltage of the reverse-phase voltage. In the embodiment, the compensation amount is generated by giving priority to one of the normal-phase component or the reverse-phase component according to the magnitude of the normal-phase component of the system voltage.

The three-phase voltage detection circuit 91 receives the input of the alternating current voltage data VAC1 and VAC2, converts the alternating current voltage data VAC1 and VAC2 into the phase voltages of the three-phase alternating current, and outputs the phase voltages. The output of the three-phase voltage detection circuit 91 is supplied to the abc-dq transformation circuits 92 and 102.

The abc-dq transformation circuits 92 and 102 receive the input of the three phase voltages of the three-phase alternating current and perform rotating coordinate transformations, e.g., dq transformations. The dq transformations perform dq transformations of the phase voltages by using Formula (1). ω of Formula (1) is the angular frequency of the three-phase alternating current and is, for example, 2π×50 [rad/s] or 2π×60 [rad/s].

[Formula 1]

$$\begin{bmatrix} d \\ q \end{bmatrix} = \frac{2}{3} \begin{bmatrix} \sin\omega t & \sin\left(\omega t - \frac{2}{3}\pi\right) & \sin\left(\omega t + \frac{2}{3}\pi\right) \\ \cos\omega t & \cos\left(\omega t - \frac{2}{3}\pi\right) & \cos\left(\omega t + \frac{2}{3}\pi\right) \end{bmatrix} \begin{bmatrix} a \\ b \\ c \end{bmatrix} \quad (1)$$

The abc-dq transformation circuit (the first coordinate transformation circuit) 92 of the signal processing system of the normal-phase voltage side performs a dq transformation of the normal-phase components of the phase voltages. In the example, the dq transformation is performed by inputting the phase voltages of the R-phase, the S-phase, and the T-phase respectively as (a, b, c) of Formula (1).

The abc-dq transformation circuit (the second coordinate transformation circuit) 102 of the signal processing system of the reverse-phase voltage side performs a dq transformation of the reverse-phase components of the phase voltages. In the example, the dq transformation is performed by inputting the phase voltages of the R-phase, the T-phase, and the S-phase respectively as (a, b, c) of Formula (1). The normal-phase components and the reverse-phase components of the system voltage are divided by such a connection. The normal-phase voltages that are divided are input to the abc-dq transformation circuit 92 of the signal processing system of the normal-phase voltage side; the reverse-phase voltages that are divided are input to the abc-dq transformation circuit 102 of the signal processing system of the reverse-phase voltage side; and the signal processing is performed independently.

The separation of the normal-phase components and the reverse-phase components of the system voltage is not limited to that described above; for example, the reverse-phase components of the normal-phase components may be divided for each control system by supplying, as the synchronization signal to the rotating coordinate transformation circuit, the phase of the PLL output reversed 180°.

Thus, the abc-dq transformation circuit 92 of the signal processing system of the normal-phase voltage side outputs the detected values of the normal-phase components of the phase voltages. The detected values are output as a d-axis component $V_{Dn}$ and a q-axis component $V_{Qn}$. The d-axis component $V_{Dn}$ and the q-axis component $V_{Qn}$ are mutually-orthogonal vectors. The d-axis component $V_{Dn}$ of the normal-phase voltage is a voltage signal having the same phase as the phase of the normal-phase voltage of the power system, and the q-axis component $V_{Qn}$ is a voltage signal having a phase leading the phase of the normal-phase voltage of the power system by 90°.

Similarly, the abc-dq transformation circuit 102 of the signal processing system of the reverse-phase voltage side outputs the detected values of the reverse-phase components of the phase voltages. For these detected values as well, the two components of a d-axis component $V_{Dr}$ and a q-axis component $V_{Qr}$ that are mutually-orthogonal are output. The d-axis component $V_{Dr}$ of the reverse-phase voltage is a voltage signal having the same phase as the phase of the reverse-phase voltage of the power system, and the q-axis component $V_{Qr}$ is a voltage signal having a phase leading the phase of the reverse-phase voltage of the power system by 90°.

The low-pass filter 93 is connected to the side of the abc-dq transformation circuit 92 outputting the d-axis component $V_{Dn}$. Hereinbelow, the low-pass filter is called the LPF and is notated as LPF in the drawings. The LPF 94 is connected to the side of the abc-dq transformation circuit 92 outputting the q-axis component $V_{Qn}$.

The LPF 103 is connected to the side of the abc-dq transformation circuit 102 outputting the d-axis component $V_{Dr}$. The LPF 104 is connected to the side of the abc-dq transformation circuit 102 outputting the q-axis component $V_{Qr}$.

When the dq transformation of the normal-phase component of the system voltage is performed, a reverse-phase component that has a frequency of 2 times the system voltage is superimposed onto a direct-current normal-phase component for each of the d-axis component $V_{Dn}$ and the q-axis component $V_{Qn}$. When the dq transformation of the reverse-phase voltage of the system voltage is performed, a normal-phase voltage that has a frequency of 2 times the system voltage is superimposed onto a direct-current reverse-phase component for each of the d-axis component $V_{Dr}$ and the q-axis component $V_{Qr}$.

The direct current components are extracted from the outputs of the abc-dq transformation circuits 92 and 102 by removing the frequency components of 2 times the system voltage by using the LPFs 93, 94, 103, and 104. The extracted direct current components can be used respectively as the dq transformation values of the normal-phase voltages and the reverse-phase voltages.

A d-axis component $V_{Dne}$ of the normal-phase voltages that is extracted is input to the compensation voltage arithmetic part 95 with a preset target value $V_{Dn*}$ for the d-axis of the normal-phase voltages of the system voltage. In the compensation voltage arithmetic part 95 as described above, a compensation amount that corresponds to the compensation voltage corresponding to the difference between the normal-phase d-axis component and the normal-phase d-axis target value is supplied to the dq-abc transformation circuit 97.

A q-axis component $V_{Qne}$ of the normal-phase voltages that is extracted is input to the PLL 112. As described below relating to the PLL 112, the normal-phase q-axis component is controlled by the PLL 112 to be 0. The difference between the normal-phase q-axis component $V_{Qne}$ and the system normal-phase voltage q-axis target value may be calculated by an adder-subtracter, and the calculated difference may be input to the dq-abc transformation circuit 97.

The difference between a d-axis component $V_{Dre}$ of the reverse-phase voltages that is extracted and a target value $V_{Dr*}$ for the d-axis of the reverse-phase voltages of the system voltage is calculated by an adder-subtracter (a second arithmetic part) 105, and the difference is input to the dq-abc transformation circuit 107. The difference between a q-axis component $V_{Qre}$ of the reverse-phase voltages that is extracted and a target value $V_{Qr*}$ for the q-axis of the reverse-phase voltages of the system voltage is calculated by an adder-subtracter (a second arithmetic part) 106, and the difference is input to the dq-abc transformation circuit 107.

These outputs and differences correspond to the compensation voltages for the phase voltages of the power system and are called the compensation amounts. The dq-abc transformation circuits 97 and 107 receive the inputs of the compensation amounts of the d-axis and the compensation amounts of the q-axis, perform reverse dq transformations using Formula (2), generate compensation amounts including the normal-phase components and the reverse-phase components of the phase voltages, and output the compensation amounts.

[Formula 2]

$$\begin{bmatrix} a \\ b \\ c \end{bmatrix} = \begin{bmatrix} \sin\omega t & \cos\omega t \\ \sin\left(\omega t - \frac{2}{3}\pi\right) & \cos\left(\omega t - \frac{2}{3}\pi\right) \\ \sin\left(\omega t + \frac{2}{3}\pi\right) & \cos\left(\omega t + \frac{2}{3}\pi\right) \end{bmatrix} \begin{bmatrix} d \\ q \end{bmatrix} \quad (2)$$

Outputs $U_N$, $V_N$, and $W_N$ of the dq-abc transformation circuit 97 of the signal processing system of the normal-phase voltage side are added respectively to outputs $U_R$, $V_R$, and $W_R$ of the dq-abc transformation circuit 107 of the signal processing system of the reverse-phase voltage side by adders 108 to 110. The output signals that correspond to these compensation amounts are supplied to the gate drive signal generation circuit 111, are input to the gate drive signal generation circuit, and are converted into a gate drive signal to correspond to the necessary compensation voltages.

The PLL 112 receives the input of the normal-phase q-axis component $V_{Qne}$ and generates and outputs a synchronization signal θ to cause the normal-phase q-axis component $V_{Qne}$ that is input to be zero. The output of the PLL 112 is supplied to the abc-dq transformation circuits 92 and 102 and the dq-abc transformation circuits 97 and 107. That is, the abc-dq transformation circuits 92 and 102 and the dq-abc transformation circuits 97 and 107 are caused to operate synchronously with the phase (the power angle) of the normal-phase voltage of the power system by the PLL 112.

Generally, in a power system, the three-phase alternating current voltages are made of the sum of the zero-phase voltages, the normal-phase voltages, and the reverse-phase voltages. In the case of a three-phase three-line technique, the zero-phase voltages are zero constantly; therefore, it is unnecessary to consider the zero-phase voltages, and the sum total of the phase voltages of the three phases always is zero. Unbalanced voltages are made of the two components of the balanced normal-phase voltages and the balanced reverse-phase voltages. Accordingly, as described above, by dividing the three-phase alternating current into the normal-phase components and the reverse-phase components, processing for generating compensation amounts of the normal-phase components and the reverse-phase components can be performed. Then, by adding the normal-phase components and the reverse-phase components of the compensation amounts, a pattern of the gate drive signal corresponding to the compensation voltages corresponding to the phase voltages can be generated easily.

Figure 3A:
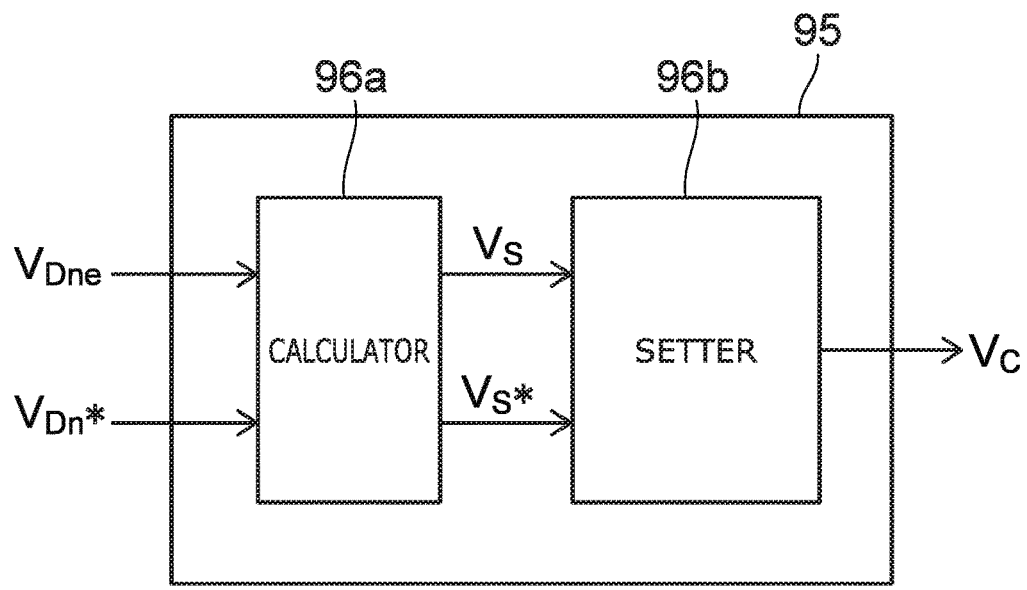
FIG. 3A is a block diagram illustrating a portion of the voltage compensation device of the first embodiment.

FIG. 3A is a block diagram illustrating a portion of the voltage compensation device of the embodiment.

A configuration example of the compensation voltage arithmetic part 95 of FIG. 2 is schematically shown in FIG. 3A.

As shown in FIG. 3A, the compensation voltage arithmetic part 95 includes a calculator 96a that calculates the system voltage, and a setter 96b in which the compensation voltage characteristic is set. The output of the LPF 93 is connected to the calculator 96a, and the d-axis component $V_{Dne}$ of the normal-phase voltages of the system voltage is input to the calculator 96a. The preset d-axis target value $V_{Dn*}$ of the system normal-phase voltage is input to the calculator 96a. The calculator 96a calculates a system voltage $V_s$ and a target voltage $V_{s*}$ as effective values by multiplying the d-axis component $V_{Dne}$ and the d-axis target value $V_{Dn*}$ by a prescribed constant.

The d-axis component $V_{Dne}$ is equal to the peak value of the phase voltages of the power system. Also, the d-axis target value $V_{Dn*}$ is set as the peak value of the phase voltages of the power system. In the example, the effective value of the phase voltage is calculated by dividing each of the d-axis component $V_{Dne}$ and the d-axis target value $V_{Dn*}$ that are input by the square root of 2. Then, by multiplying the calculated values by the square root of 3, the d-axis component $V_{Dne}$ and the d-axis target value $V_{Dn*}$ each are converted into values corresponding to the effective value of the line voltage of the power system.

The system voltage $V_s$ that is calculated by the calculator 96a is input to the setter 96b, and the target voltage $V_{s*}$ of the system voltage is set in the setter 96b. The setter 96b outputs a compensation voltage $V_c$ corresponding to the system voltage that is input. Although not illustrated, the value of the compensation voltage $V_c$ output from the setter 96b is converted into a compensation amount corresponding to the compensation voltage by being supplied to a dq-abc transformation circuit to match the subsequent processing system.

Here, a specific example of the compensation voltage characteristic of the embodiment will be described.

Figure 3B:
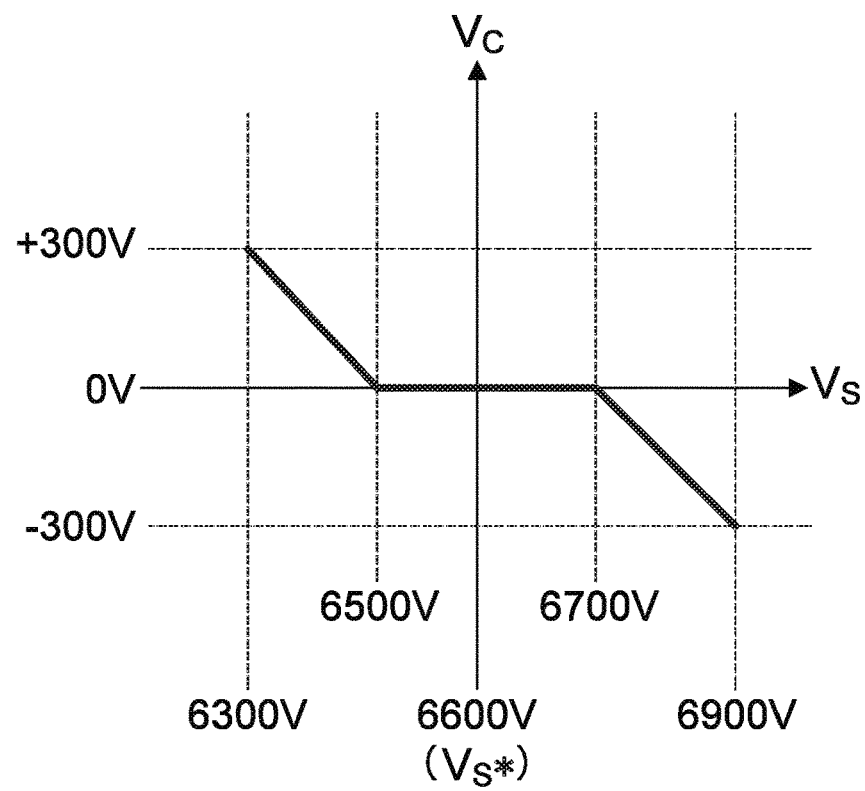
FIG. 3B is a graph showing a setting example of a setter.

FIG. 3B is a graph showing a setting example of the setter.

As shown in FIG. 3B, the setter 96b includes data of the compensation voltage $V_c$ for the system voltage $V_s$. For example, the first control circuit 81 stores such data as a table in memory (not illustrated). Or, the data may be generated automatically by setting an unbalanced voltage compensation priority range described below.

In the example, the target voltage $V_{s*}$ of the system voltage $V_s$ is set to 6600 V. The characteristic of the setter 96b is such that when the system voltage $V_s$ is within the range of 6600 V±100 V, the compensation voltage $V_c$ is 0 V regardless of the magnitude of the system voltage $V_s$. When the range of the system voltage $V_s$ is greater or less than the range of 6600 V±100 V, different compensation voltages $V_c$ are set according to the system voltage $V_s$.

For example, when the system voltage $V_s$ is 6900 V (6600 V+300 V), the compensation voltage $V_c$ is set to −300 V; when the system voltage $V_s$ is 6300 V (6600 V−300 V), the compensation voltage $V_c$ is set to +300 V. That is, the compensation voltage $V_c$ is set to be equal to the difference between the system voltage and the target voltage.

Hereinbelow, a range such as the range of 6600 V±100 V of FIG. 3B in which the compensation voltage $V_c$ is set to 0 V regardless of the system voltage $V_s$ is called the unbalanced voltage compensation priority range. Also, an input voltage range of the system voltage $V_s$ such as the range of 6600 V±300 V of FIG. 3B is called the system voltage input range, and the range in which the unbalanced voltage compensation priority range is excluded from the input range of the system voltage is called the normal-phase voltage compensation range.

In the embodiment, the relationship between the system voltage and the compensation voltage of the setter 96b is set to be different between the unbalanced voltage compensation priority range and the normal-phase voltage compensation range.

In the unbalanced voltage compensation priority range, the compensation voltage that corresponds to the reverse-phase voltage can be given priority over the normal-phase voltage in the output of the voltage compensation device 1. By outputting the compensation voltage corresponding to the reverse-phase component with priority, the unbalanced state of the system voltage can be compensated with priority.

In the normal-phase voltage compensation range, the voltage compensation device 1 outputs a compensation voltage to compensate the increase amount when the system voltage increases, and outputs a compensation voltage to compensate the decrease amount when the system voltage decreases. Accordingly, the voltage compensation device 1 performs a compensation operation for the normal-phase voltage with priority.

The voltage value of the specific example described above can be set appropriately and arbitrarily according to the application of the voltage compensation device 1, etc. Also, the relationship between the system voltage and the compensation voltage is not limited to the case of the example described above. For example, rather than 0 V, the setting value of the compensation voltage may be set to a constant value that is sufficiently small compared to the compensation voltage corresponding to the system voltage. Also, this is not limited to a constant value; the compensation voltage may be set to change according to the system voltage.

In the output of the voltage compensation device 1 of the embodiment, priority can be given to one of the compensation amount corresponding to the normal-phase components or the compensation amount corresponding to the reverse-phase components according to the setting of the unbalanced voltage compensation range. The compensation voltage that can be output by the voltage compensation device 1 is limited by the maximum value of the output voltage of the first power converter 20; therefore, according to the embodiment, the limited output range of the compensation voltage can be utilized effectively.

The second control circuit 82 (FIG. 2) includes, for example, an alternating current control circuit and the like 120. In the example, the alternating current control circuit and the like 120 receives the input of the current data IL1 and IL2 which is the data of the alternating current supplied via the inductors 51 and 52, receives the input of the direct current voltage data VDC acquired by the direct current voltage detector 75, and controls the active power and the direct current voltage supplied to the first power converter 20.

Operations of the voltage compensation device 1 of the embodiment will now be described.

Based on the phase voltages of the upstream side of the power system, the voltage compensation device 1 of the embodiment compensates the voltage for each phase so that each voltage becomes the prescribed phase voltage. When the phase voltages of the downstream side are less than the prescribed value, compensation voltages are added so that the phase voltages of the downstream side become the prescribed value. When the phase voltages of the downstream side are not less than the prescribed value, compensation voltages are subtracted so that the phase voltages of the downstream side become the prescribed value.

The compensation of the phase voltages is performed by setting the voltages and the phases generated at the secondary windings 11s, 13s, and 15s. For example, when the prescribed value of the phase voltage of the U-phase is X [V] and the actual phase voltage of the U-phase is X [V]−Δx [V], the voltage compensation device 1 outputs dx [V] having the same phase as the power system to the secondary winding 11s. The phase voltage of the downstream side is set to X [V] by the series transformer 11. When the actual phase voltage of the U-phase is X [V]+Δx [V], the voltage compensation device 1 outputs, to the secondary winding 11s, Δx [V] having a phase 180° different from that of the power system. The phase voltage of the downstream side is set to X [V] by the series transformer 11.

The compensation operations described above are performed independently for the normal-phase voltages and the reverse-phase voltages of the power system according to the generated compensation amounts. The compensation amounts that are generated by the control system of the normal-phase voltage side are generated with priority when the normal-phase components of the system voltage are greater or less than the unbalanced compensation priority range. The compensation amounts that are generated by the control system of the reverse-phase voltage side are generated with priority when the normal-phase voltages are within the unbalanced compensation priority range.

That is, the voltage compensation device 1 of the embodiment compensates the voltage values by adding the compensation voltages, etc., when the voltage values of the system voltage are greater or less than the target voltages. Even when the fluctuations of the voltage values of the system voltage are small, if there are unbalanced voltages, the unbalanced state is compensated by outputting the compensation voltages based on the compensation amounts generated by the reverse-phase voltage side.

In the voltage compensation device 1 of the embodiment, the phase voltage of each phase can be compensated because the dq transformations are performed by dividing the normal-phase components and the reverse-phase components. Therefore, in addition to the voltage compensation of the balanced voltages, voltage compensation can be performed also for the unbalanced state occurring at the upstream side, and balanced voltages can be supplied downstream.

Even when the range of the normal-phase voltage is within the unbalanced voltage compensation priority range, the first control circuit 81 can generate the compensation amount based on a q-axis target value $V_{Qn*}$ and perform a compensation operation according to the compensation amount. That is, when the range of the normal-phase voltage is within the unbalanced voltage compensation priority range, the voltage compensation device 1 can operate as a reactive power compensation device and supply reactive power to the power system.

Effects of the voltage compensation device 1 of the embodiment will now be described while comparing to a voltage compensation device 200 of a comparative example.

Figure 4:
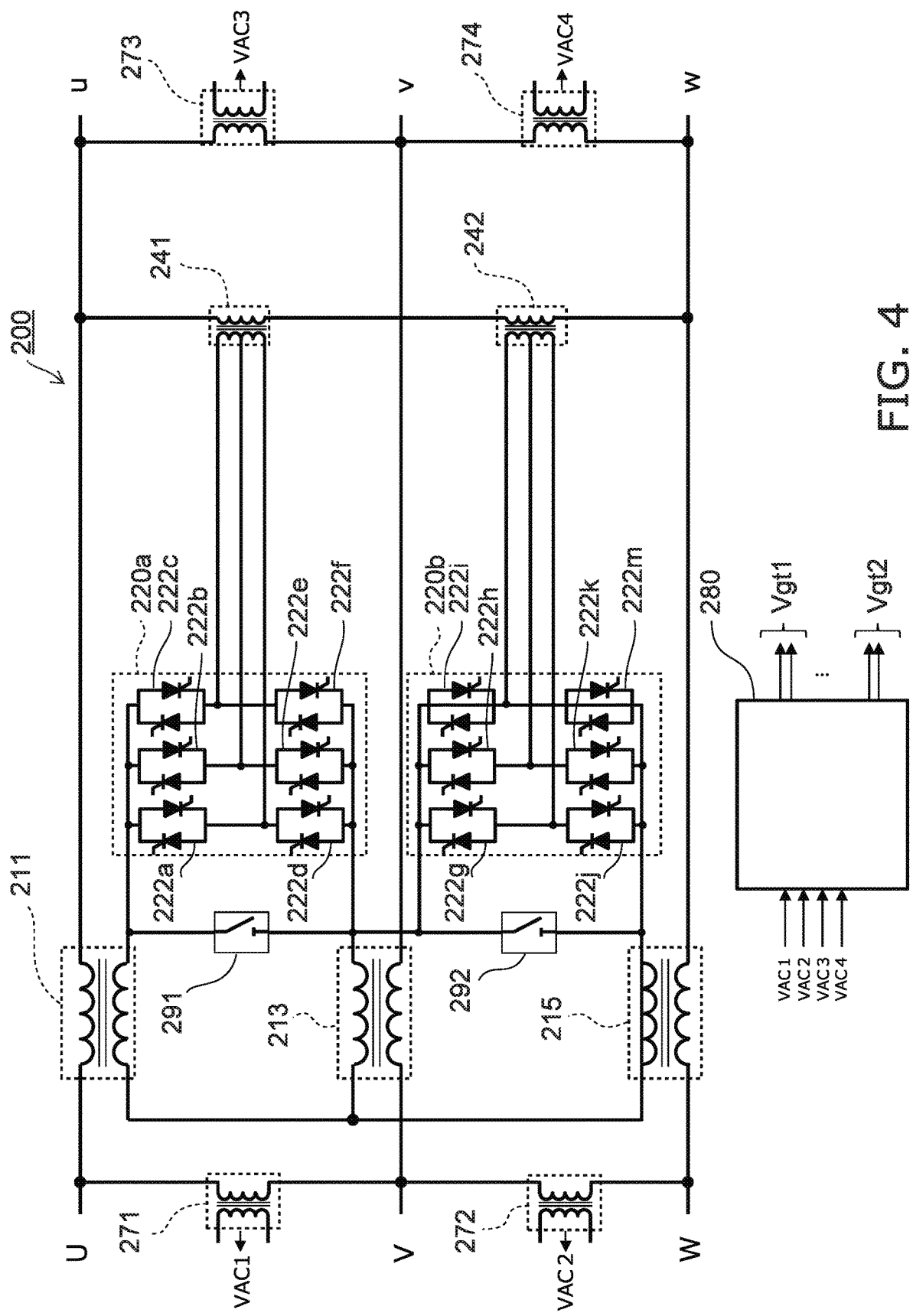
FIG. 4 is a block diagram illustrating a voltage compensation device of a comparative example.

FIG. 4 is a block diagram illustrating the voltage compensation device of the comparative example.

As shown in FIG. 4, the voltage compensation device 200 of the comparative example includes series transformers 211, 213, and 215, tap changer circuits 220a and 220b, parallel transformers 241 and 242, alternating current voltage detectors 271 to 274, and a controller 280. In the voltage compensation device 200 of the comparative example, the primary windings of the series transformers 211, 213, and 215 are connected in series to the phases of the power system. One end of each of the secondary windings of the series transformers 211, 213, and 215 are connected to each other. The other end of the secondary winding of the series transformer 211 is connected to one terminal of the tap changer circuit 220a. The other end of the secondary winding of the series transformer 213 is connected to the other terminal of the tap changer circuit 220a. The other end of the secondary winding of the series transformer 213 also is connected to one terminal of the tap changer circuit 220b. The other end of the secondary winding of the series transformer 215 is connected to the other terminal of the tap changer circuit 220b.

The tap changer circuit 220a includes switch circuits 222a to 222f corresponding to the number of taps on the secondary side of the parallel transformer 241. In the switch circuits 222a to 222f, bidirectional switch circuits in which thyristors are connected in anti-parallel are connected in series, and the number of bidirectional switch circuits connected in series is equal to the number of taps on the secondary side of the parallel transformer 241. The tap changer circuit 220b has the same circuit configuration as the tap changer circuit 220a. In switch circuits 222g to 222m, bidirectional switch circuits in which thyristors are connected in anti-parallel are connected in series, and the number of bidirectional switch circuits connected in series is equal to the number of taps on the secondary side of the parallel transformer 242.

The primary winding of the parallel transformer 241 is connected between downstream (the u-phase) of the U-phase and downstream (the v-phase) of the V-phase. The primary winding of the parallel transformer 242 is connected between downstream (the v-phase) of the V-phase and downstream (the w-phase) of the W-phase. Each of the taps of the secondary windings of the parallel transformers 241 and 242 is connected to a series connection node of the bidirectional switches.

The alternating current voltage detectors 271 to 274 are connected similarly to the alternating current voltage detectors 71 to 74 of the voltage compensation device 1 of the first embodiment.

The controller 280 includes an upper limit and a lower limit of a target voltage of the voltage of the power system. Signals Vtg1 and Vtg2 that trigger the gates of the thyristors are generated by comparing the detection results of the alternating current voltage detectors 271 to 274 and the upper limit and the lower limit of the target voltage.

Contactors 291 and 292 are connected to two ends for the tap changer circuits 220a and 220b. The contactors 291 and 292 operate when the thyristors of the tap changer circuits 220a and 220b are turned OFF forcibly.

In the voltage compensation device 200 of the comparative example, the secondary windings of the series transformers 211, 213, and 215 and the secondary windings of the parallel transformers 241 and 242 are connected by the bidirectional switches 222a to 222m using thyristors. The controller 280 compares the detection results of the alternating current voltage detectors 271 to 274 and the preset upper limit and lower limit of the target voltage. Then, for each of the phases, when the voltage is less than the lower limit of the target value, the controller 280 controls the bidirectional switches to connect to taps outputting a higher voltage to increase the voltage of the primary winding of the series transformer. For example, when the downstream voltage of the U-phase is low, the controller 280 generates the gate drive signal to switch the bidirectional switches 222c and 222d ON. The bidirectional switches 222c and 220d are connected to the taps of the parallel transformer 241 generating the highest voltage. When the downstream voltage of the U-phase is high, the controller 280 generates the gate drive signal to switch the bidirectional switches 222a and 222f ON. The bidirectional switches 222a and 222f are connected to the taps of the parallel transformer 241 generating the highest voltage, and the voltage of the connected taps is applied with the reverse phase of the voltage of the U-phase.

Thus, in the voltage compensation device 200 of the comparative example, the voltages of the series transformers 211, 213, and 215 are compensated by switching between the taps provided in the parallel transformers 241 and 242; therefore, the setting value of the compensation voltage has discrete values dependent on the number of taps. In the voltage compensation device 200 of the comparative example, the compensation voltage is discrete; therefore, additional equipment such as a reactive power compensation device, etc., are necessary further downstream of the power system, the system is complex, and the cost also increases.

Also, in the voltage compensation device 200 of the comparative example, the compensation voltage can only be set discretely; therefore, it is difficult to compensate unbalanced voltages by setting the voltage for each phase. Accordingly, when an unbalanced load is connected to downstream in the power system, etc., there is a risk that effects of the unbalanced load also may occur upstream in the power system.

Also, in the bidirectional switches using the thyristors in the voltage compensation device 200 of the comparative example, a time for ½ of the period of the voltage of each phase of the power system is necessary when switching between the taps of the parallel transformers 241 and 242. Therefore, the response time of the voltage compensation device 200 is constrained by the period of the power system.

Compared to such a voltage compensation device 200 of the comparative example, in the voltage compensation device 1 of the embodiment, the detected voltage data and the compensation amounts for the first power converter 20 are generated as substantially continuous data in the first control circuit 81. For example, the values of the alternating current voltage data VAC1 and VAC2 are read by analog/digital converters (AD converters); therefore, the precision of these data is increased to the level determined by the resolution of the AD converters. Accordingly, compensation voltages that have substantially continuous values can be set. In the power system using the voltage compensation device 1 of the embodiment, a device or a system for increasing the precision of the compensation voltages is unnecessary; therefore, the entire system can be simple for the system, and the cost can be reduced.

Also, in the voltage compensation device 1 of the embodiment as described above, the compensation voltages can be set independently for each of the normal-phase voltages and the reverse-phase voltages of the power system; therefore, the compensation of unbalanced voltages also can be performed. Also, the priority of the compensation amounts corresponding to the normal-phase voltages and the compensation amounts corresponding to the reverse-phase voltages of the power system can be set appropriately by the compensation voltage arithmetic part 95. Therefore, the voltage compensation and the unbalanced compensation can be performed by effectively utilizing the maximum voltage that can be output by the first power converter 20.

Also, in the voltage compensation device 1 of the embodiment, the voltage compensation is performed by power converters using self arc-extinguishing type switching elements; therefore, the voltage compensation operation can be performed quickly regardless of the period of the power system.

Conventionally, contrivances for compensating the voltage has been performed at locations where it is predicted that the voltage of the power system may decrease according to the distance from the power substation, etc. For example, at the system end where the voltage drop of a pole transformer is predicted, the tap positions are preset to a high voltage, etc. Also, for the system impedance, phase-advancing capacitors that support the voltage by supplying leading reactive power also are used. However, these countermeasures are countermeasures presupposing that the consumers consume electrical power; when the electrical power demand decreases such as at night, a problem occurs in that the system voltage is increased unnecessarily.

To cope with such problems, a TVR (Thyristor Voltage Regulator) such as the voltage compensation device 200 of the comparative example has been proposed. As described above, the TVR has the function of varying the compensation voltage according to the system voltage; therefore, the electrical power drop in the daytime when the electrical power demand is large can be accommodated, and the voltage increase at night also can be accommodated.

However, the TVR performs the voltage compensation operation by controlling the voltages applied to the series transformers by switching between the parallel transformer taps by using thyristors; therefore, the response time is slow; the compensation voltages in the voltage compensation operation are discontinuous due to being dependent on the transformer taps; and conditions such that voltage abnormalities cannot be compensated are occurring in recent power systems in which the reverse power flow is increasing as domestic solar power generation becomes widespread.

In the voltage compensation device 1 of the embodiment, not only continuous voltage compensation but also independent voltage compensation of the phases is possible; thereby, the voltage compensation of the power systems of higher complexity of recent years can be performed quickly and effectively.

Modification of First Embodiment

Figure 5:
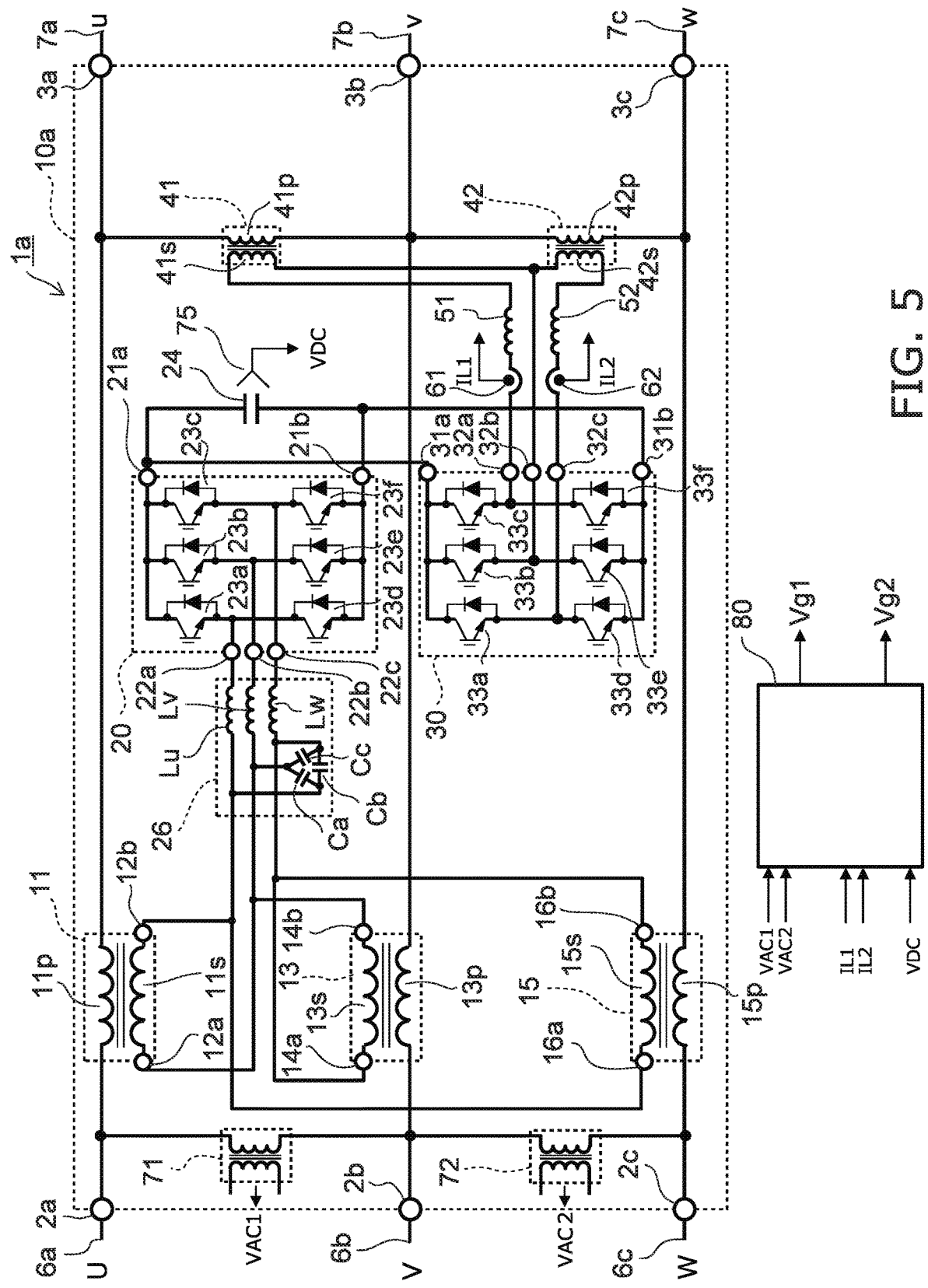
FIG. 5 is a block diagram illustrating a voltage compensation device of a modification of the first embodiment.

FIG. 5 is a block diagram illustrating a voltage compensation device 1a of the modification. The secondary windings 11s, 13s, and 15s of the series transformers 11, 13, and 15 has a star connection. The secondary windings 11s, 13s, and 15s are not limited to a star connection, and can have a delta connection.

Other than the electrical connection of the secondary windings 11s, 13s, and 15s of the series transformers 11, 13, and 15, the voltage compensation device 1a of the modification is the same as the voltage compensation device 1 of the first embodiment; the same components are marked with the same reference numerals; and a detailed description is omitted.

In the voltage compensation device 1a of the modification as shown in FIG. 5, the secondary winding 11s of the series transformer 11 of a voltage compensator 10a includes the terminals 12a and 12b. The secondary winding 13s of the series transformer 13 includes the terminals 14a and 14b. The secondary winding 15s of the series transformer 15 includes the terminals 16a and 16b. The one-terminals 12a, 14a, and 16a are winding start positions of the secondary windings 11s, 13s, and 15s, and the other-terminals 12b, 14b, and 16b are the winding end positions. The one terminal 12a is connected to the other terminal 14b, the one terminal 14a is connected to the other terminal 16b, and the one terminal 16a is connected to the other terminal 12b. The connection node of the terminals 12a and 14b is connected to the alternating current output terminal 22b of the first power converter 20. The connection node of the terminals 14a and 16b is connected to the alternating current output terminal 22c of the first power converter 20. The connection node of the terminals 16a and 12b is connected to the alternating current output terminal 22a of the first power converter 20. That is, the secondary windings 11s, 13s, and 15s of the series transformers 11, 13, and 15 have a delta connection and are connected to the alternating current output terminals 22a, 22b, and 22c of the first power converter 20.

The voltage compensation device 1a of the modification operates similarly to the voltage compensation device 1 of the first embodiment. Namely, when the voltage across the series transformer is less than the lower limit of the target voltage, a voltage that corresponds to the insufficient voltage amount of the same phase as the primary winding is generated in the secondary winding and added to the voltage of the primary winding via magnetic coupling. When the voltage across the series transformer is greater than the upper limit of the target voltage, a voltage that corresponds to the insufficient voltage amount of the reverse phase of the primary winding is generated in the secondary winding and added to, i.e., subtracted from, the primary winding via magnetic coupling.

Actions and effects of the voltage compensation device 1a of the embodiment will now be described.

When series transformers that have a star connection are connected to the output of the first power converter 20, an advantage is provided in that the electrical connection operation is easy because the one-terminals of the secondary windings are connected to the output of the first power converter 20. On the other hand, in a star connection, the other-terminals of the secondary windings are connected to each other as a neutral point, but the neutral point is not connected elsewhere; the current cannot flow elsewhere when voltage distortion occurs due to nonlinearity of the transformers, etc.; therefore, there are cases where problems occur in that the voltage distortion phenomenon is not resolved easily.

When the series transformers having a delta connection are connected to the output of the first power converter 20, the electrical connection operation is complex because the secondary windings of the phases are connected to each other, etc.; on the other hand, a return current can be caused to flow through the secondary windings. Therefore, in the voltage compensation device 1a, voltage distortion does not occur easily, and high-quality electrical power can be connected to the power system.

In the voltage compensation device 1a of the embodiment, the secondary windings 11s, 13s, and 15s of the series transformers 11, 13, and 15 that are connected to the output of the first power converter 20 have a delta connection; therefore, a connection of high-quality electrical power having low voltage distortion is possible.

One of a star connection or a delta connection is applicable to the secondary windings 11s, 13s, and 15s of the series transformers 11, 13, and 15 also in the other embodiments described below.

Second Embodiment

Figure 6:
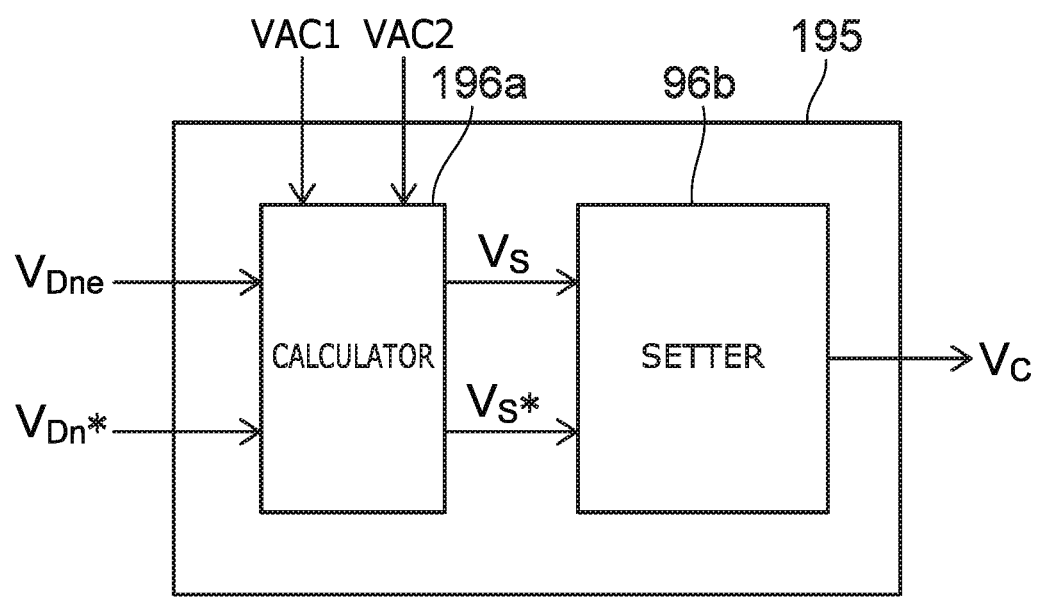
FIG. 6 is a block diagram illustrating a portion of a voltage compensation device of a second embodiment.

FIG. 6 is a block diagram illustrating a portion of a voltage compensation device of the embodiment.

An example of the elements of a compensation voltage arithmetic part 195 of the case of the embodiment is schematically shown in FIG. 6.

As shown in FIG. 6, the compensation voltage arithmetic part 195 includes a calculator 196a that calculates the system voltage, and the setter 96b in which a compensation voltage characteristic is set. In the embodiment, the configuration of the calculator 196a is different from those of the other embodiments described above, and the other elements are the same as those of the other embodiments described above.

The calculator 196a receives the input of the d-axis component $V_{Dne}$ of the normal-phase voltages of the system and the d-axis target value $V_{Dn*}$ of the normal-phase voltages of the system and receives the input of the alternating current voltage data VAC1 and VAC2 supplied from the alternating current voltage detectors 71 and 72. Based on these inputs, the calculator 196a calculates the effective values of the system voltage $V_s$ and the target value $V_{s*}$ of the system voltage $V_s$ and supplies the effective values to the setter 96b.

More specifically, the calculator 196a calculates the effective values of the phases by calculating the mean square values of the alternating current voltage data VAC1 and VAC2 which are the line voltages of the three-phase alternating current. The calculator 196a averages the effective values of the phases that are calculated and uses the average as the effective value of the system voltage.

In the setter 96b, the compensation voltage $V_c$ for the system voltage $V_s$ calculated by the calculator 196a is designated, and the target voltage $V_{s*}$ of the system voltage $V_s$ is set.

Thus, the target value and/or the measured value of the system voltage can be obtained appropriately from the value of the normal-phase d-axis component.

Third Embodiment

Figure 7:
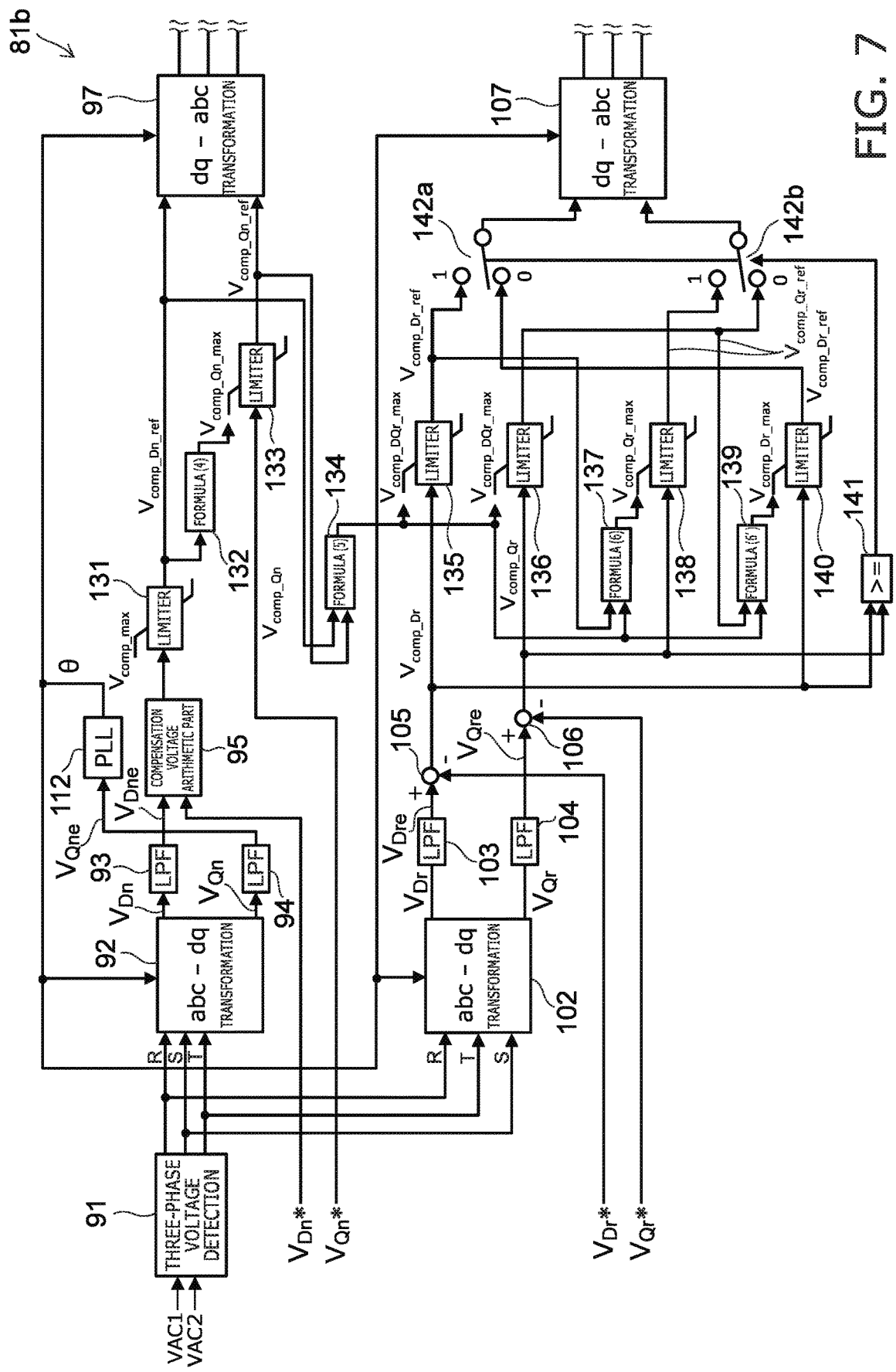
FIG. 7 is a block diagram illustrating a portion of a voltage compensation device of a third embodiment.

FIG. 7 is a block diagram illustrating a portion of a voltage compensation device of the embodiment.

A portion of a first control circuit 81b is shown in FIG. 7. The parts beyond the outputs of the dq-abc transformation circuits 97 and 107 that are not shown in the drawing are the same as those of the first embodiment described above, etc.

In the other embodiments described above, the case is described where the unbalanced voltage compensation is performed by a compensation corresponding to the reverse-phase voltages without substantially performing a compensation corresponding to the normal-phase voltages when the range is within the unbalanced voltage compensation priority range. More specifically, the case is described in the embodiment where a voltage compensation that has higher precision is performed by assigning a priority order to the compensation corresponding to the normal-phase voltages and the compensation corresponding to the reverse-phase voltages. Because there is an upper limit to the voltage that can be output by the first power converter 20 as described above, for example, in the normal-phase voltage compensation range, a priority order is assigned to the d-axis component and the q-axis component, and a priority order is assigned between the normal-phase voltage compensation and the reverse-phase voltage compensation.

In the embodiment as shown in FIG. 7, the first control circuit 81b further includes limiters 131, 133, 135, 136, 138, and 140, arithmetic circuits 132, 134, 137, and 139, a comparator 141, and switches 142a and 142b.

The limiter 131 is provided between the compensation voltage arithmetic part 95 and the dq-abc transformation circuit 97. The limiter (a first limiter) 131 limits the input signal to be within the range of $\pm V_{comp\_max}$. When the amplitude of the signal input to the limiter 131 is within $\pm V_{comp\_max}$ range, the input signal is output as-is. When the amplitude of the signal input to the limiter 131 is outside $\pm V_{comp\_max}$, the limiter 131 outputs $\pm V_{comp\_max}$. The signal that is output from the limiter 131 is input to the dq-abc transformation circuit 97 as a compensation amount $V_{comp\_Dn\_ref}$ of the normal-phase d-axis component.

Positive and negative limit values are provided in each of the limiters. In the drawing as well, although not illustrated to avoid complexity, limit values on the negative side also are provided. Unless otherwise specified hereinbelow, when referring to the limit value of the limiter, the limit value on the negative side also is provided, and the absolute values of the positive and negative limit values are equal. When the input signal is within the range of the positive and negative limit values, the input signal is output as-is; when the input signal is outside the positive or negative limit value, the input signal is limited to the limit value. However, the limit values are not limited to the case of positive and negative values having equal absolute values, and any setting may be used.

The target value of the normal-phase q-axis is input to the input of the limiter (a second limiter) 133. The output of the limiter 133 is connected to the dq-abc transformation circuit 97. The limit value of the limiter 133 is set to a limit value $V_{comp\_Qn\_max}$ of the normal-phase q-axis component compensation amount. Although elaborated below, the limit value $V_{comp\_Qn\_max}$ changes according to a maximum compensation amount $V_{comp\_max}$ and the compensation amount $V_{comp\_Dn\_ref}$. The value of the limit value $V_{comp\_Qn\_max}$ is set by being calculated by the arithmetic circuit 132. The maximum compensation amount $V_{comp\_max}$ is preset based on the maximum voltage of the first power converter 20.

The limiter (a third limiter) 135 is provided between the adder-subtracter 105 and the dq-abc transformation circuit 107 of the signal processing system of the reverse-phase voltage side. The limit value of the limiter 135 is set to a limit value $V_{comp\_DQr\_max}$ of the reverse phase compensation amount. Although elaborated below, the limit value $V_{comp\_DQr\_max}$ changes according to the maximum compensation amount $V_{comp\_max}$, the compensation amount $V_{comp\_Dn\_ref}$, and a compensation amount $V_{comp\_Qn\_ref}$ of the normal-phase q-axis component. The value of the limit value $V_{comp\_DQr\_max}$ is set by being calculated by the arithmetic circuit 134.

The limiter (a fourth limiter) 136 is provided between the adder-subtracter 106 and the dq-abc transformation circuit 107 of the signal processing system of the reverse-phase voltage side. The limit value of the limiter 136 is set to the limit value $V_{comp\_DQr\_max}$.

The limiter 138 is provided between the adder-subtracter 106 and the dq-abc transformation circuit 107. The limit value of the limiter 138 is set to a limit value $V_{comp\_DQr\_max}$ of the reverse-phase q-axis compensation amount. Although elaborated below, the limit value $V_{comp\_DQr\_max}$ changes according to the limit value $V_{comp\_DQr\_max}$ and a compensation amount $V_{comp\_Dr\_ref}$ of the reverse-phase d-axis component. The value of the limit value $V_{comp\_Qr\_max}$ is set by being calculated by the arithmetic circuit 137.

The limiter 140 is provided between the adder-subtracter 105 and the dq-abc transformation circuit 107. The limit value of the limiter 140 is set to a limit value $V_{comp\_Dr\_max}$ of the reverse-phase d-axis compensation amount. As elaborated below, the limit value $V_{comp\_Dr\_max}$ changes according to the limit value $V_{comp\_DQr\_max}$ and a compensation amount $V_{comp\_Qr\_ref}$. The value of the limit value $V_{comp\_Dr\_max}$ is set by being calculated by the arithmetic circuit 139.

The comparator 141 compares the size relationship of the magnitudes of the outputs of the adder-subtracters 105 and 106. That is, the comparator 141 compares the magnitudes of an output value $V_{comp\_Dr}$ of the reverse-phase d-axis output from the adder-subtracter 105 and an output value $V_{comp\_Qr}$ of the reverse-phase q-axis output from the adder-subtracter 106. For example, the comparator 141 outputs the logical value of 1 when $V_{comp\_Dr} \geq V_{comp\_Qr}$. The logical value of 0 is output when $V_{comp\_Dr} < V_{comp\_Qr}$.

The switch 142a is connected between the dq-abc transformation circuit 107 and the limiters 135 and 140. The switch 142a connects the output of the limiter 135 or the output of the limiter 140 to the dq-abc transformation circuit 107 by switching. The connection destination of the switch 142a is switched according to the input of the logical value; for example, in the case of the logical value of 1, the output of the limiter 135 is selected, and the output of the limiter 135 is supplied to the dq-abc transformation circuit 107. When the logical value of 0 is input, the switch 142a selects the output of the limiter 140, and the output of the limiter 136 is supplied to the dq-abc transformation circuit 107.

The switch 142b is connected between the dq-abc transformation circuit 107 and the limiters 138 and 136. The switch 142b inputs the output of the limiter 138 or the output of the limiter 136 to the dq-abc transformation circuit 107 by switching. The connection destination of the switch 142b is switched according to the input of the logical value; for example, in the case of the logical value of 1, the output of the limiter 138 is selected, and the output of the limiter 138 is supplied to the dq-abc transformation circuit 107. When the logical value of 0 is input, the switch 142b selects the output of the limiter 136, and the output of the limiter 136 is supplied to the dq-abc transformation circuit 107.

That is, when $V_{comp\_Dr} \geq V_{comp\_Qr}$, the compensation amount $V_{comp\_Dr\_ref}$ that is output from the limiter 135 and the compensation amount $V_{comp\_Qr\_ref}$ that is output from the limiter 138 each are input to the dq-abc transformation circuit 107. When $V_{comp\_Dr} < V_{comp\_Qr}$, the compensation amount $V_{comp\_Dr\_ref}$ that is output from the limiter 140 and the compensation amount $V_{comp\_Qr\_ref}$ that is output from the limiter 136 each are input to the dq-abc transformation circuit 107.

Operations of the voltage compensation device of the embodiment will now be described.

Figure 8B:
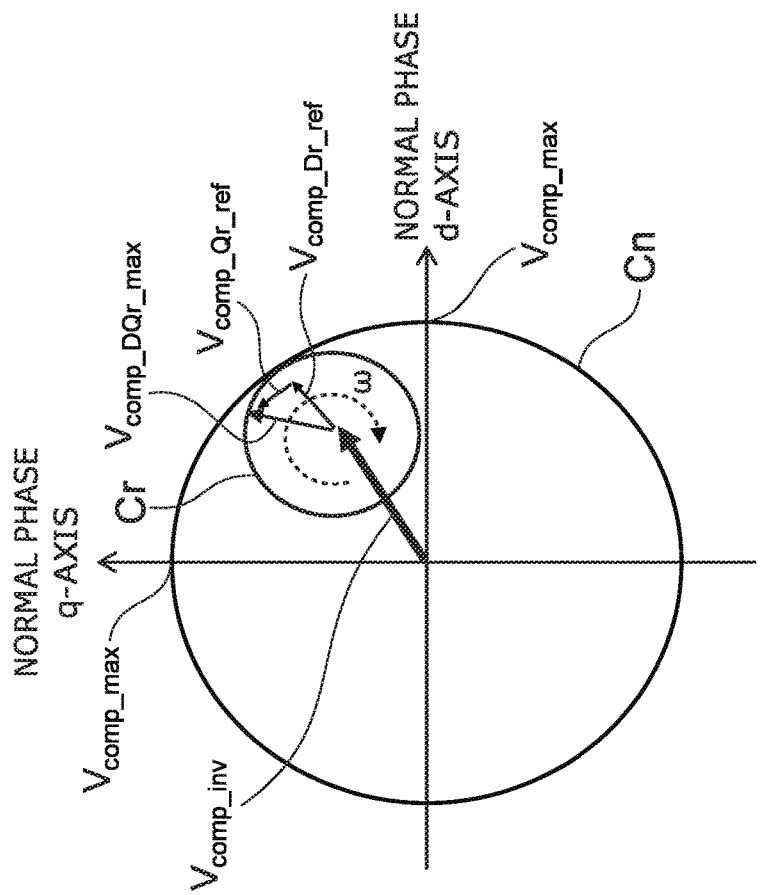
FIG. 8A and FIG. 8B are conceptual views for describing the operations of the voltage compensation device of the third embodiment.
Figure 8A:
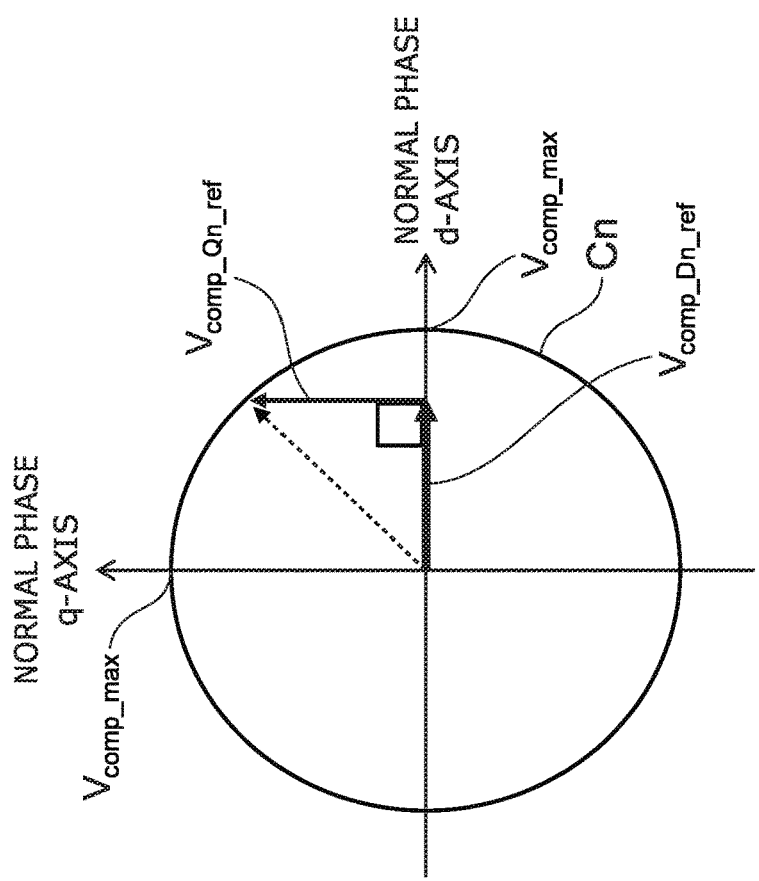

FIG. 8A and FIG. 8B are conceptual views for describing the operations of the voltage compensation device of the embodiment.

In the voltage compensation device of the embodiment, the compensation amount that is generated according to an output other than the normal-phase d-axis component is used with priority when the magnitude of the normal-phase d-axis component is within the unbalanced voltage compensation range. In such a case, the compensation amount that is generated according to the magnitude of the normal-phase q-axis component (=the magnitude of the normal-phase q-axis target value) is given priority; therefore, the voltage compensation device functions as a reactive power compensation device.

Also, in the voltage compensation device of the embodiment, when the magnitude of the normal-phase d-axis component is within the normal-phase voltage compensation range, the compensation amount is generated with priority in the order of the normal-phase d-axis component, the normal-phase q-axis component, and the magnitude of the reverse-phase voltage. In the signal processing system of the reverse-phase voltage side, the compensation amount is allotted with priority to the greater of the magnitude of the reverse-phase d-axis component or the magnitude of the reverse-phase q-axis component.

As shown in FIG. 8A, the normal-phase components of the compensation amount are illustrated by vectors on a two-dimensional plane having the d-axis and the q-axis. The d-axis and the q-axis are orthogonal. The radius of a circle Cn illustrates the maximum compensation amount $V_{comp\_max}$. That is, the radius of the circle Cn is the maximum compensation amount $V_{comp\_max}$ corresponding to the maximum voltage of the first power converter 20. The vector that is parallel to the d-axis illustrates the compensation amount $V_{comp\_Dn\_ref}$. The vector that is parallel to the q-axis illustrates the compensation amount $V_{comp\_Qn\_ref}$.

When allotting the output with priority to the normal-phase components of the compensation amount, the maximum compensation amount $V_{comp\_max}$ is equal to the compensation amount $V_{comp\_Dn\_ref}$. This is a vector sum with the compensation amount $V_{comp\_Qn\_ref}$. A compensation amount $V_{comp\_inv}$ is determined by the following Formula (3) by the Pythagorean theorem. Here, $V_{comp\_Dn}$ and $V_{comp\_Qn}$ respectively are the outputs of the LPFs 93 and 94 and are called the output value of the normal-phase d-axis and the output value of the normal-phase q-axis.

[Formula 3]

$$V_{comp\_inv} = \sqrt{V_{comp\_Dn}^2 + V_{comp\_Qn}^2} \qquad (3)$$

In the embodiment, it is possible to output the output value $V_{comp\_Dn}$ of the normal-phase d-axis up to a limit value $V_{comp\_Dn\_max}$ which is its maximum value. $V_{comp\_Dn\_max}$ at this time is equal to the maximum compensation amount $V_{comp\_max}$. When the compensation amount $V_{comp\_Dn\_ref}$ is less than $V_{comp\_max}$, the excess amount is allotted to the output value $V_{comp\_Qn}$. The limit value $V_{comp\_Qn\_max}$ at this time is determined by Formula (4) by replacing the compensation amount $V_{comp\_inv}$ with the maximum compensation amount $V_{comp\_max}$. The calculation of Formula (4) is performed by the arithmetic circuit 132.

[Formula 4]

$$V_{comp\_Qn\_max} = \sqrt{V_{comp\_max}^2 - V_{comp\_Dn\_ref}^2} \qquad (4)$$

That is, the compensation amount $V_{comp\_Qn\_max}$ is set using the maximum compensation amount $V_{comp\_max}$ and the compensation amount $V_{comp\_Dn\_ref}$.

When the compensation amount of the normal-phase d-axis is within the unbalanced voltage compensation range, for example, it is sufficient to set $V_{comp\_Dn\_ref} = 0$ in Formula (4). Accordingly, the compensation amount of the normal-phase q-axis can be output up to the maximum compensation amount $V_{comp\_max}$.

FIG. 8B shows the case where the magnitudes of the normal-phase components of the compensation amount are less than the maximum compensation amount $V_{comp\_max}$, an excess of the compensation amount occurs, and the excess amount is allotted to the reverse-phase components. An inner circle Cr of the circle Cn schematically illustrates the trajectory of the vectors of the reverse-phase components. The reverse-phase components are vectors that rotate through the circle Cr at an angular velocity ω in the reverse direction of the normal-phase components. The compensation amount of the normal-phase components is the compensation amount $V_{comp\_inv}$ of Formula (3). The allotment to the reverse-phase components is possible due to the difference between the maximum compensation amount $V_{comp\_max}$ and the compensation amount $V_{comp\_inv}$ of the normal-phase components which is determined by Formula (5). The calculation of Formula (5) is performed by the arithmetic circuit 134.

[Formula 5]

$$V_{comp\_DQr\_max} = V_{comp\_max} - \sqrt{V_{comp\_Dn\_ref}^2 + V_{comp\_Qn\_ref}^2} \quad (5)$$

The limit value $V_{comp\_DQr\_max}$ is illustrated by the magnitude of the vector sum of the compensation amount $V_{comp\_Dr\_ref}$ and the compensation amount $V_{comp\_Qr\_ref}$. In the embodiment, which of the compensation amount $V_{comp\_Dr\_ref}$ or the compensation amount $V_{comp\_Qr\_ref}$ is given priority is determined by the size relationship of the output value $V_{comp\_Dr}$ and the output value $V_{comp\_Qr}$ before the limiter input. The size relationship of $V_{comp\_Dr}$ and $V_{comp\_Qr}$ is compared by the comparator 141. The connections of the switches 142a and 142b are switched according to the output of the comparator 141.

The d-axis output is given priority when $V_{comp\_Dr} \geq V_{comp\_Qr}$. Therefore, the limit value $V_{comp\_Qr\_max}$ changes according to the compensation amount $V_{comp\_Dr\_ref}$. The limit value $V_{comp\_Qr\_max}$ is determined by Formula (6). The calculation of Formula (6) is performed by the arithmetic circuit 137.

[Formula 6]

$$V_{comp\_Qr\_max} = \sqrt{V_{comp\_DQr\_max}^2 - V_{comp\_Dr\_ref}^2} \quad (6)$$

The q-axis output is given priority when $V_{comp\_Dr} < V_{comp\_Qr}$. Therefore, the limit value $V_{comp\_Dr\_max}$ changes according to the compensation amount $V_{comp\_Qr\_ref}$. The limit value $V_{comp\_Dr\_max}$ is determined by Formula (6'). The calculation of Formula (6') is performed by the arithmetic circuit 139.

[Formula 7]

$$V_{comp\_Dr\_max} = \sqrt{V_{comp\_DQr\_max}^2 - V_{comp\_Qr\_ref}^2} \quad (6')$$

When the compensation amount of the normal-phase d-axis is within the unbalanced voltage compensation range, for example, it is sufficient to set $V_{comp\_Dn\_ref} = 0$ in Formula (5). The magnitude of the compensation amount of the reverse-phase voltage part is set according to the magnitude of the compensation amount of the normal-phase q-axis, and the magnitudes of the compensation amounts of the d-axis component and the q-axis component are set according to Formula (6) and Formula (6').

Effects of the voltage compensation device of the embodiment will now be described.

In the voltage compensation device of the embodiment, the compensation amounts are limited in the first control circuit 81b so that the maximum voltage of the first power converter 20 is not exceeded. The limits of the compensation amounts are set so that the normal-phase components can be output with priority among the normal-phase components and the reverse-phase components. Therefore, even when large compensation amounts are output by the abc-dq transformation circuits 92 and 102, the compensation amounts of the reverse-phase components are more limited and are limited to be not more than the maximum compensation amount. Therefore, the voltage compensation device can output compensation voltages without distortion.

The compensation amounts of the reverse-phase components can be output with priority to selecting the greater of the d-axis component and the q-axis component; therefore, the contribution of the one having the greater effect on the unbalanced voltage can be increased.

In the multiple embodiments described above, the configuration of the control circuit is set based on which among the normal-phase components or the reverse-phase components of the compensation amounts to allot with priority, and which among the d-axis component or the q-axis component of the normal-phase components or the reverse-phase components to allot with priority. Whether or not to secure any component with priority as the compensation amount is not limited to the foregoing description and can be set arbitrarily in an appropriate range.

According to the embodiments described above, a voltage compensation device can be realized in which the voltage of the power system is compensated quickly and continuously to an appropriate value.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

The invention claimed is:

1. A voltage compensation device, comprising:
a power converter including an inverter circuit including a switching element, the switching element being of a self arc-extinguishing type;
series transformers including primary windings connected in series to phases of a three-phase alternating current, and secondary windings connected to an output of the power converter; and
a controller generating a drive signal based on voltages of the phases of the three-phase alternating current and supplying the drive signal to the power converter, the drive signal driving the switching element,
the controller including
a first coordinate transformation circuit generating a first output and a second output by performing a rotating coordinate transformation of normal-phase components of the three-phase alternating current, the first output being a vector component of a same phase as the normal-phase components, the second output being a vector component orthogonal to the first output,
a first arithmetic part calculating a system voltage indicating a voltage value of the three-phase alternating current based on a direct current component of the first output, and generating a first compensation amount corresponding to a compensation voltage set to compensate a shift of the system voltage from a preset target voltage, a second coordinate transformation circuit generating a third output and a fourth output by performing a rotating coordinate transformation of reverse-phase components of the three-phase alternating current, the third output and the fourth output being orthogonal to each other, and a second arithmetic part generating a second compensation amount based on a direct current component of the third output and a direct current component of the fourth output, the second compensation amount being a compensation amount of a reverse-phase component of the system voltage, the controller generating the drive signal based on the first compensation amount and the second compensation amount, the first arithmetic part generating the first compensation amount corresponding to the compensation voltage when the system voltage is outside a prescribed range, generating the first compensation amount to be less than compensation amount corresponding to the compensation voltage when the system voltage is within the prescribed range, the controller generating the drive signal based on the first compensation amount with higher priority than the second compensation amount when the system voltage is outside the prescribed range, generating the drive signal based on the second compensation amount with higher priority than the first compensation amount when the system voltage is within the prescribed range, the controller including
a first limiter limiting an amplitude, the first output being input to the first limiter,
a second limiter limiting an amplitude, a target value for the second output being input to the second limiter,
a third limiter limiting an amplitude, the third output being input to the third limiter,
a fourth limiter limiting an amplitude, the fourth output being input to the fourth limiter,
a first filter extracting a direct current component from the first output,
a second filter extracting a direct current component from the second output,
a third filter extracting a direct current component from the third output, and
a fourth filter extracting a direct current component from the fourth output, limit values of the first limiter, the second limiter, the third limiter and the fourth limiter being set to cause a magnitude of a vector sum of an output of the first filter, an output of the second filter, an output of the third filter and an output of the fourth filter to be not more than a maximum compensation amount corresponding to a maximum value output by the power converter.

2. The voltage compensation device according to claim 1, wherein
the first arithmetic part generates the first compensation amount to cause the compensation voltage to be 0 when the system voltage is within the prescribed range.

3. The voltage compensation device according to claim 1, wherein
when a magnitude of a vector sum of the first output and the target value is not more than the maximum compensation amount, the limit value of the second limiter is set based on magnitudes of the maximum compensation amount and the first output.

4. The voltage compensation device according to claim 3, wherein a magnitude of a vector sum of the limit value of the third limiter and the limit value of the fourth limiter is set based on the maximum compensation amount, a magnitude of the output of the first limiter, and a magnitude of the output of the second limiter.

5. The voltage compensation device according to claim 4, wherein
the limit value of the fourth limiter is set based on the magnitude of the output of the third filter when a magnitude of the output of the third filter is not less than a magnitude of the output of the fourth filter, and
the limit value of the third limiter is set based on the magnitude of the output of the fourth filter when the output of the fourth filter is greater than the output of the third filter.

6. The voltage compensation device according to claim 1, wherein
the first arithmetic part calculates the system voltage by performing a prescribed calculation on the direct current component of the first output.

7. The voltage compensation device according to claim 1, wherein
the first arithmetic part calculates the system voltage based on an alternating current voltage between the phases of the three-phase alternating current.

* * * * *